United States Patent
Gupta et al.

(10) Patent No.: US 11,681,454 B2
(45) Date of Patent: Jun. 20, 2023

(54) EFFICIENTLY STORING DATA IN A CLOUD STORAGE

(71) Applicant: Cohesity, Inc., San Jose, CA (US)

(72) Inventors: Anubhav Gupta, Sunnyvale, CA (US); Praveen Kumar Yarlagadda, Santa Clara, CA (US); Venkata Ranga Radhanikanth Guturi, San Jose, CA (US); Zhihuan Qiu, San Jose, CA (US); Sarthak Agarwal, Fremont, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 17/402,206

(22) Filed: Aug. 13, 2021

(65) Prior Publication Data

US 2022/0083250 A1    Mar. 17, 2022

Related U.S. Application Data

(60) Provisional application No. 63/074,682, filed on Sep. 4, 2020.

(51) Int. Cl.
*G06F 3/06* (2006.01)

(52) U.S. Cl.
CPC .......... *G06F 3/0644* (2013.01); *G06F 3/0604* (2013.01); *G06F 3/067* (2013.01); *G06F 3/0608* (2013.01); *G06F 3/0631* (2013.01)

(58) Field of Classification Search
CPC .... G06F 3/0644; G06F 3/0604; G06F 3/0608; G06F 3/0631; G06F 3/067; G06F 3/0619; G06F 3/065; G06F 3/0659; H04L 67/1097

See application file for complete search history.

(56) References Cited

U.S. PATENT DOCUMENTS

| | | | |
|---|---|---|---|
| 9,280,550 B1 | 3/2016 | Hsu | |
| 9,588,977 B1 | 3/2017 | Wang | |
| 9,696,913 B1 | 7/2017 | Aron | |
| 9,959,138 B1 | 5/2018 | Vaish | |
| 10,176,550 B1 | 1/2019 | Baggerman | |
| 10,783,269 B1 * | 9/2020 | Shraer | G06F 16/1752 |
| 2013/0086303 A1 | 4/2013 | Ludwig | |
| 2016/0021026 A1 | 1/2016 | Aron | |
| 2016/0034508 A1 | 2/2016 | Aron | |
| 2016/0352833 A1 | 12/2016 | Dhamdhere | |
| 2019/0034507 A1 | 1/2019 | Duttagupta | |
| 2019/0065508 A1 | 2/2019 | Guturi | |
| 2019/0369890 A1 | 12/2019 | Danilov | |
| 2021/0133060 A1 * | 5/2021 | David | G06F 11/1662 |
| 2021/0165575 A1 * | 6/2021 | Hutcheson, Jr | G06F 11/1451 |

* cited by examiner

*Primary Examiner* — Masud K Khan
(74) *Attorney, Agent, or Firm* — Van Pelt, Yi & James LLP

(57) ABSTRACT

A cloud server determines that a size of a first cloud storage element object is at least below a first threshold. In response to the first determination, a client-side component is requested to store additional data in the cloud storage element object including by having the client-side component update the first cloud storage element with an updated version that includes previously existing data of the first cloud storage element and the additional data. The first cloud storage element object is added to a set of one or more cloud storage element objects available for update. The client-side component is configured to generate an updated version of the first cloud storage element object that has a size that is greater than or equal to the first threshold.

20 Claims, 9 Drawing Sheets

EFFICIENTLY STORING DATA IN A CLOUD STORAGE

CROSS REFERENCE TO OTHER APPLICATIONS

This application claims priority to U.S. Provisional Patent Application No. 63/074,682 entitled EFFICIENTLY STORING DATA IN A CLOUD STORAGE filed Sep. 4, 2020 which is incorporated herein by reference for all purposes.

BACKGROUND OF THE INVENTION

Data Management as a Service (DMaaS) enables an entity (e.g., enterprise, organization, government, company, user, individual, etc.) to manage data associated with the entity using one or more cloud services provided by a cloud service provider. The cloud service provider may charge the entity for its services based on the amount of cloud storage used by the entity. The entity may copy its data from its datacenter to the cloud storage. However, merely copying data associated with the entity from the datacenter associated with the entity to the cloud storage provided by the cloud service provider may lead to an inefficient use of the cloud storage due to an increase in costs associated with future operations on the copied data.

BRIEF DESCRIPTION OF THE DRAWINGS

Various embodiments of the invention are disclosed in the following detailed description and the accompanying drawings.

DETAILED DESCRIPTION

Figure 1:
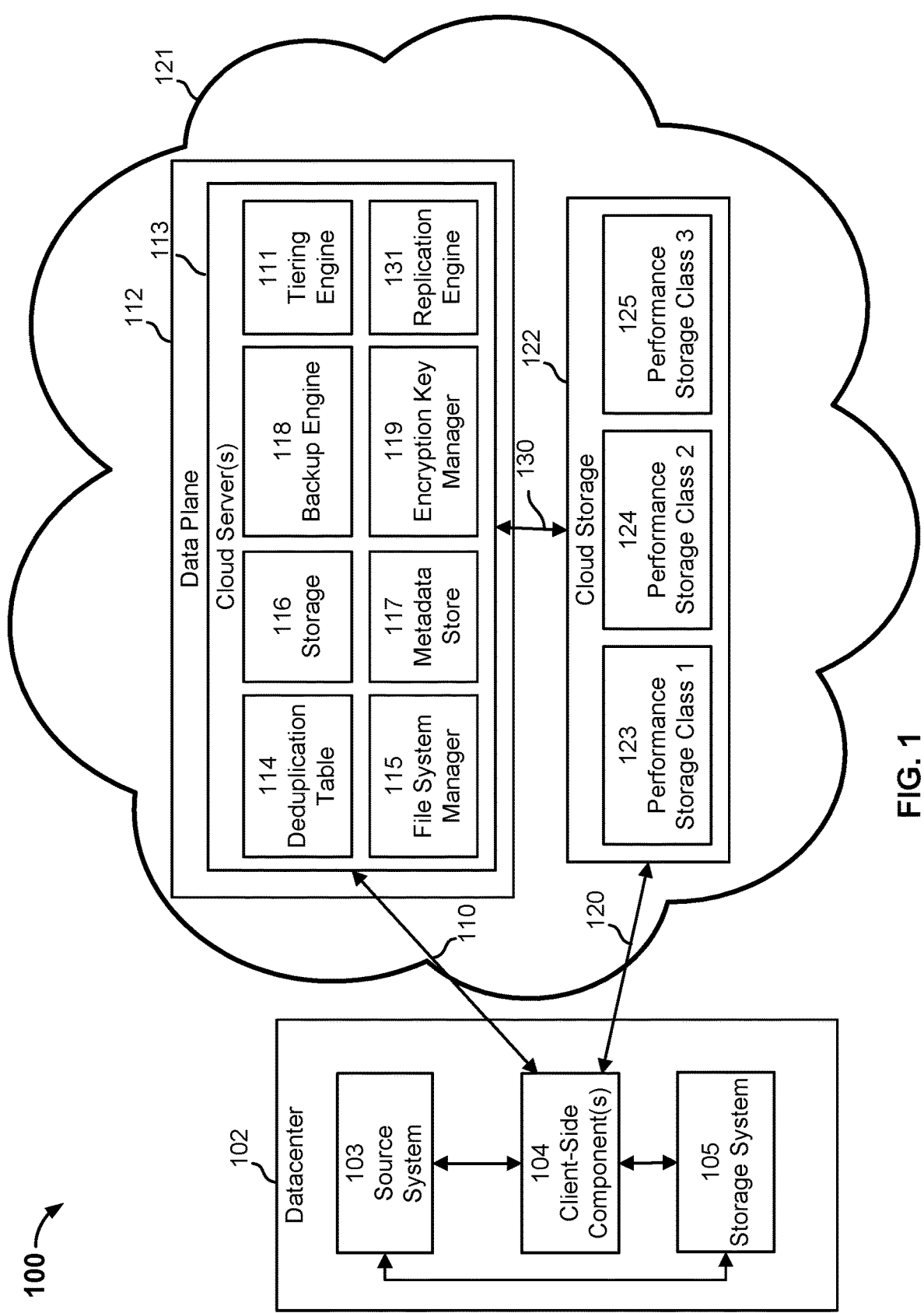
FIG. 1 is a block diagram illustrating a system for storing data in a cloud storage in accordance with some embodiments.

Techniques to efficiently store data in a cloud storage are disclosed herein. One technique to efficiently store data in the cloud storage includes reducing the amount of data associated with an entity stored in a cloud storage by deduplicating the data associated with the entity stored in the cloud storage. The cloud storage provider may provide cloud storage for a plurality of entities. Each of the entities may be referred herein to as a "storage tenant."

A data plane may be configured to perform one or more data management services (e.g., backup, tiering, replication, migration, etc.) and control how data associated with a storage tenant is stored in the cloud storage. For example, the data plane may include a backup engine that is configured to determine when a source system associated with the storage tenant is to perform a backup, a tiering engine that is configured to determine when an object is to be tiered from the source system to cloud storage, and/or a replication engine that is configured to determine when data content is to be replicated from the source system to cloud storage. The source system may be part of a datacenter that includes a client-side component. The client-side component may be a virtual machine, a container, a server, an application, etc. The client-side component may be configured to establish and securely communicate with the data plane via a bidirectional network connection (e.g., gRPC (gRPC remote procedure call) connection).

The client-side component may receive from the backup engine a specification of content to be backed up from the source system to the cloud storage. In some embodiments, the specification of content describes a full backup of the source system. In some embodiments, the specification of content describes an incremental backup of the source system. In some embodiments, the specification of content describes a full backup of an object included in the source system (e.g., virtual machine, container, application, storage cluster). In some embodiments, the specification of content describes an incremental backup of an object included in the source system. In some embodiments, the specification of content describes a storage tier for one or more objects stored on the source system (e.g., one or more files, one or more virtual machines, one or more containers, one or more applications, one or more databases, etc.). For example, a backup of a file stored on the source system may be tiered to a first performance storage class associated with a cloud storage, a second performance storage class associated with the cloud storage, or a third performance storage class associated with the cloud storage.

The client-side component may receive from a tiering engine a specification of content to be tiered from a source system to the cloud storage. In some embodiments, the client-side component determines a specification of content to be tiered from the source system to the cloud storage. In some embodiments, the specification of content describes a storage tier for one or more objects stored on the source system. For example, a file stored on the source system may be tiered from the source system to a first performance storage class associated with a cloud storage, a second performance storage class associated with the cloud storage, or a third performance storage class associated with the cloud storage.

The client-side component may receive from a replication engine a specification of content to be replicated from a source system to the cloud storage. In some embodiments, the specification of content describes a storage tier for one or more objects stored on the source system. For example, a file stored on the source system may be replicated from the source system to a first performance storage class associated with a cloud storage, a second performance storage class associated with the cloud storage, or a third performance storage class associated with the cloud storage.

The client-side component may be configured to request and receive the content in a plurality of portions from the source system. A received portion may include metadata associated with one or more objects stored on the source system (e.g., owner, created, last update, size, permissions, etc.) and/or data content associated with the one or more objects stored on the source system. For each received portion of content, the client-side component divides the received portion of content into a plurality of data chunks. In some embodiments, a specification of content to be stored in the cloud storage is received from a backup engine. In some embodiments, a specification of content to be stored in the cloud storage is received from a source system. In some embodiments, the plurality of data chunks are of variable size. The client-side component may generate corresponding chunk identifiers (e.g., secure hash algorithm 1 (SHA-1) identifier) for each of the plurality of data chunks included in a portion of received content. Data chunk metadata that includes the corresponding chunk identifiers is sent to a file system manager that is included in a cloud server of the data plane. For each data chunk, the data chunk metadata may also include a corresponding data chunk size and a corresponding object offset. The data chunk metadata indicates a sequence of data chunks within an object. For example, the data chunk metadata may indicate that a first data chunk having a chunk identifier of C1 is associated with an object offset of 0 MB-1 MB and has a data chunk size of 1 MB, a second data chunk having a chunk identifier of C2 is associated with an object offset of 1 MB-2 MB and has a data chunk of 1 MB, . . . , and an 8th data chunk identifier of C8 is associated with an object offset of 7 MB-8 MB and has a data chunk size of 1 MB.

In response to receiving the corresponding chunk identifiers for each of the plurality of data chunks, the file system manager is configured to compare each of the corresponding chunk identifiers to chunk identifiers included in a deduplication table stored at the data plane. The chunk identifiers included in the deduplication table indicate at least some of the data chunks associated with the storage tenant that are already stored in the cloud storage. If the client-side component were to write to the cloud storage data chunks that are already stored at the cloud storage, then the cloud storage would store duplicate copies of the same data chunks, which is an inefficient use of the cloud storage.

The file system manager is configured to provide a data structure to the client-side component. In some embodiments, the data structure indicates one or more data chunks requested by the file system manager (e.g., the one or more chunk identifiers of the one or more received chunk identifiers that do not correspond to data chunks stored at the cloud storage). In some embodiments, the data structure indicates the one or more chunk identifiers that correspond to one or more data chunks that are stored at the cloud storage, but the one or more chunk identifiers associated with the one or more data chunks that are stored at the cloud storage are not included in the deduplication table due to one or more factors, such as whether the data chunk is referenced by a tree data structure that was generated after a particular date, a recency of when the data chunk was last deduplicated, a frequency at which the data chunk is deduplicated, a service level agreement, a storage tier of a data chunk, etc. In response to receiving the data structure, the client-side component is configured to use the data structure to identify the one or more data chunks of the portion of the received content that are to be sent to be stored at the cloud storage.

The file system manager may also send to the client-side component a reference to one or more portions of one or more cloud storage element objects of the cloud storage to which the client-side component may write the one or more data chunks associated with the one or more chunk identifiers included in the data structure. The reference may include corresponding identifiers for the one or more cloud storage element objects. In some embodiments, the one or more cloud storage element objects include one or more new cloud storage element objects, one or more existing cloud storage element objects, and/or one or more cloud storage element objects yet to be created. In some embodiments, the reference may comprise one or more identifiers which the client-side component may use to create new cloud storage element objects of the cloud storage.

The client-side component may receive an encryption key from a cloud server that is located in the data plane. The cloud server may include an encryption key manager that manages encryption keys for a plurality of storage tenants. The received encryption key is particular to the storage tenant. In some embodiments, the encryption key enables read access for a cloud storage element object associated with the storage tenant at a credential level or write access for a new cloud storage element object associated with the storage tenant at a credential level to prevent overwriting or deleting of existing files. That is, write access is not permitted for existing files. For example, some cloud storage element objects may each have a unique credential. In some embodiments, the encryption key enables read or write access for a cloud storage element object associated with the storage tenant at a prefix level. For example, a prefix may be a partial or full file path in the cloud storage. A prefix may be unique to a storage tenant. Some or all cloud storage element objects of a particular storage tenant may be stored in cloud storage and share a prefix. The encryption key may expire after a particular amount of time. A source system associated with the storage tenant may be hacked and having the encryption key expire after the particular amount of time may prevent a hacker from accessing any of the cloud storage element objects associated with the storage tenant that are stored at the cloud storage.

Another technique to efficiently store data in the cloud storage includes combining a plurality of the identified data chunks into one or more batches. In some embodiments, a default size of a cloud storage element object is specified (e.g., 8 MB). In some embodiments, a size of a batch of data chunks is the default size of the cloud storage element object. Storing this particular batch of data chunks at the cloud storage is an efficient use of the cloud storage. In some embodiments, a size of a batch of data chunks is less than the default size of the cloud storage element object, but greater than or equal to a threshold size. This is a sub-optimal configuration of the cloud storage due to overhead costs associated with future operations on the cloud storage element objects. For example, storing a large number of cloud storage element objects associated with an object that are less than the default size increases the number of reads needed to restore the object, which increases the overall amount of time needed to restore the object. In some embodiments, a size of a batch of data chunks is less than the default size of the cloud storage element object and less than the threshold size. Storing batches of data chunks that are less than the default size of the cloud storage element object and less than the threshold size may also increase transaction and/or storage costs associated with the batch of data chunks. For example, storing a large number of cloud storage element objects associated with an object that are less than the threshold size also increases the number of reads needed to restore the object, which increases the overall amount of time needed to restore the object.

In some embodiments, a default range size of a cloud storage element object is specified (e.g., 4 MB-12 MB). In some embodiments, the size of a batch of data chunks is within the default size range of a cloud storage element object. In some embodiments, the size of a batch of data chunks is not within the default size range of a cloud storage element object.

Prior to writing a batch of data chunks to a cloud storage element object that was indicated by the file system manager of the data plane, the client-side component may compare a batch size of a batch to a threshold size (e.g., 4 MB) or a default size range (e.g., 4 MB-12 MB). Additional overhead costs may be incurred by storing at the cloud storage cloud storage element objects that have a size that is less than the threshold size or outside the default size range. Such cloud storage element objects may require additional application programming interface (API) calls to access the cloud storage element objects, which may add to the overall time and resources needed to perform a data management function (e.g., garbage collection, deduplication, replication, backup, etc.).

In the event the batch size of a batch is greater than or equal to the threshold size, the client-side component may encrypt the data chunks included in the batch with the received encryption key and write the encrypted data chunks to one of the cloud storage element objects identified by the file system manager. In some embodiments, the data chunks are compressed prior to being encrypted. An index may be updated to indicate which data chunks are included in the cloud storage element object. In some cases, the index may indicate the relative position of data chunks in the cloud storage element object. The index may include an object id and a version number. The index may be included in the cloud storage element object. In some embodiments, the client-side component generates a cloud storage element object identified by the file system manager. In some embodiments, a cloud storage generates the cloud storage element object identified by the file system manager.

In the event the batch size of the batch is not greater than or equal to the threshold size, the client-side component may determine whether a batch period greater than or equal to a batch threshold period has passed. The client-side component may store in-memory the data chunk(s) included in the batch for the batch threshold period (e.g., <1 seconds) to allow additional data chunks to be included in the batch.

In the event the batch period is not greater than or equal to the batch threshold period, the client-side component processes a subsequent portion of the specified content to identify one or more data chunks of the subsequent portion of the specified content that are to be stored in the cloud storage. The one or more data chunks of the subsequent portion are combined with the one or more data chunks of the previous portion to generate a new batch of data chunks. The client-side component determines whether a size of the new batch of data chunks is greater than the threshold size. If it is, then the client-side component determines whether the batch period is greater than or equal to the batch threshold period. If it is not, then the above process repeats until the batch threshold period is greater than or equal to the batch threshold period.

In the event the batch period is greater than or equal to the batch threshold period, the client-side component may write the one or more data chunks included in the batch to a storage of a cloud server included in the data plane, even if the size of the batch written to the storage is less than the threshold size. In response to receiving the one or more data chunks, the file system manager of the cloud server may aggregate the one or more received data chunks with one or more other received data chunks. The file system manager may determine whether a cumulative size of the aggregated data chunks is greater than the threshold size and less than a maximum size for a cloud storage element object. In the event the cumulative size of the aggregated data chunks is greater than the threshold size and less than the maximum size for the cloud storage object, the file system manager may batch the aggregated data chunks into a cloud storage element object, encrypt the batched data chunks using an encryption key particular to the storage tenant, and write the batched data chunks to a cloud storage element object associated with the cloud storage. This is an efficient use of the cloud storage because instead of storing the one or more received data chunks in a first cloud storage element object and storing the one or more other received data chunks in a second cloud storage element object, the one or more received data chunks and the one or more other received data chunks are stored in a single cloud storage element object.

In some embodiments, the cloud storage element object associated with the cloud storage is a new cloud storage element object. In some embodiments, the cloud storage element object associated with the cloud storage is a cloud storage element object that is yet to be created. In some embodiments, the cloud storage element object associated with the cloud storage is an existing cloud storage element object. In the event the cloud storage element object associated with the cloud storage is an existing cloud storage element object, the file system manager may read the data chunks associated with the existing cloud storage element object, combine the read data chunks with one or more new data chunks to generate a new version of the cloud storage element object, create an index for the new version of the cloud storage element object, and include the index in the new version of the cloud storage element object. In some embodiments, multiple threads write to the same cloud storage element object. In some cases, the index may indicate the relative position of data chunks in the cloud storage element object. The index may include an object id and a version number.

In the event the cumulative size of the aggregated data chunks is not greater than the threshold size, the file system manager may determine if the total time that the one or more received data chunks have been stored in a storage of a cloud server included in the data plane is greater than a threshold time. In the event the total time is greater than the threshold time, then the file system manager may batch the one or more received data chunks and one or more other received data chunks, if any, encrypt the batched data chunks using an encryption key particular to the storage tenant, and write the batched data chunks to a cloud storage element object associated with a cloud storage. This may cause overhead costs associated with future operations on the cloud storage element objects to be expensive because operations on small cloud storage element objects are inefficient, but may be cost effective and improve resiliency as the storage of a cloud server (e.g., EC2 instance) may be less reliable and/or more expensive than the cloud storage (e.g., S3). The one or more data chunks may be written to a cloud storage element object stored at the cloud storage to ensure that the one or more data chunks are not lost in the event the storage of the cloud server fails. In some embodiments, the cloud storage element object associated with the cloud storage is a new cloud storage element object. In some embodiments, the cloud storage element object associated with the cloud storage is a cloud storage element object yet to be created. In some embodiments, the cloud storage element object associated with the cloud storage is an existing cloud storage element object. In the event the cloud storage element object associated with the cloud storage is an existing cloud storage element object, the file system manager may read the data chunks associated with the existing cloud storage element object, combine the read data chunks with one or more new data chunks to generate a new version of the cloud storage element object, create an index for the new version of the cloud storage element object, and include the index in the new version of the cloud storage element object.

Another technique to efficiently store data in the cloud storage includes monitoring the cloud storage to identify cloud storage objects that are less than a default size or outside of the default range size. A file system manager may scan the cloud storage to identify a cloud storage element object. A size of the cloud storage element object is determined. The determined size is compared to a first threshold size (e.g., 1 MB). In the event the determined size is less than the first threshold size, the file system manager may add the cloud storage element object to a set of one or more cloud storage element objects available for a client-side component to update the cloud storage element with an updated version. The updated version may include previously existing data of the cloud storage element object and additional data. In some embodiments, a size of the updated version of the cloud storage element object is the default size for a cloud storage element object. In the event the determined size is not less than the first threshold size, but less than a second threshold size, the file system manager updates the cloud storage element object with an updated version that includes previously existing data of the cloud storage element object and the new data chunks received from the client-side component.

FIG. 1 is a block diagram illustrating a system for storing data in a cloud storage in accordance with some embodiments. In the example shown, system 100 includes a client-side component 104 that is connected to data plane 112 via connection 110 and connected to cloud storage 122 via connection 120. In some embodiments, connection 110 is a gRPC connection or other type of connection. In some embodiments, connection 120 is an HTTPS connection or other type of connection. In some embodiments, connections 110, 120 may be intermittent connections. The connection between client-side component 104 and data plane 112 or between client-side component 104 and cloud storage 122 may be a wireless or wired connection. In some embodiments, the connection between client-side component 104 and data plane 112 or between client-side component 104 and cloud storage 122 may be a gRPC connection. Connections 110, 120 may communicate data and/or information via a local area network, a wide area network, a storage area network, campus area network, metropolitan area network, system area network, intranet, the Internet, and/or a combination thereof.

One or more client-side components 104 are located in datacenter 102 (e.g., real datacenter or virtual datacenter) that is associated with a storage tenant. In some embodiments, one or more client-side components 104 are located in cloud environment 121, such as in data plane 112. A client-side component may be a virtual machine, a container, a server, an application, etc. The one or more client-side components 104 are connected (e.g., temporarily or persistently) to source system 103. In some embodiments, the one or more client-side components 104 are included in source system 103. In some embodiments, the one or more client-side components are included in a storage system 105. In some embodiments, source system 103 is a primary system. In some embodiments, source system 103 is a secondary storage system that backed up data from other sources (not shown). A primary system may be comprised of one or more computing devices (e.g., servers, desktops, laptops, etc.).

Storage system 105 may be comprised of one or more storage nodes that include one or more corresponding processors, one or more corresponding memories, and one or more corresponding storage devices.

In some embodiments, a storage node of storage system 105 includes a processor, memory, and a plurality of storage devices. The plurality of storage devices may include one or more solid state drives, one or more hard disk drives, or a combination thereof. Backed up data may be stored in the one or more solid state drives, one or more hard disk drives, or a combination thereof.

In some embodiments, a storage node of storage system 105 includes a processor and memory, and is coupled to a separate storage device. The separate storage device may include one or more storage devices (e.g., flash storage devices). A storage device may be segmented into a plurality of partitions. Each of the storage nodes may be allocated one or more of the partitions. The one or more partitions allocated to a storage node may be configured to store data associated with some or all of the changed objects that were backed up to the storage system. For example, the separate storage device may be segmented into 10 partitions and the storage system may include 10 storage nodes. A storage node of the 10 storage nodes may be allocated one of the 10 partitions.

In some embodiments, a storage node of storage system 105 includes a processor, memory, and a storage device. A storage device may be segmented into a plurality of partitions. Each of the storage nodes may be allocated one or more of the partitions. The one or more partitions allocated to a storage node may be configured to store data associated with some or all of the changed objects that were backed up to the storage system. For example, the separate storage device may be segmented into 10 partitions and the storage system may include 10 storage nodes. A storage node of the 10 storage nodes may be allocated one of the 10 partitions.

In some embodiments, the storage nodes of the storage system are homogenous nodes where each storage node has the same capabilities (e.g., processing, storage, memory, etc.). In some embodiments, at least one of the storage nodes of the storage system is a heterogeneous node with different capabilities (e.g., processing, storage, memory, etc.) than the other storage nodes of the storage system.

Source system 103 includes content (e.g., virtual machines, applications, files, filesystem data, containers, etc.) that is to be backed up to cloud storage 122. A client-side component is configured to receive the content to be backed up from source system 103 and to back up the received content. In some embodiments, the client-side component is configured to back up some or all of the received content to cloud storage 122. In some embodiments, the client-side component is configured to back up some of the received content to storage 116 included in data plane 112.

Data plane 112 is configured to orchestrate how data associated with a storage tenant is stored in cloud storage 122. For example, data associated with a storage tenant may be stored in a first performance storage class 123 (e.g., Amazon Simple Storage Service (S3)), a second performance storage class 124 (e.g., Amazon S3 Glacier), or a third performance storage class 125 (e.g., Amazon S3 Glacier Deep Archive). Although FIG. 1 depicts cloud storage 122 as having three performance tiers, cloud storage 122 may have n performance tiers. Each of the performance tiers corresponds to an object storage provided by a cloud provider (e.g., Amazon Web Services™, Microsoft™ Azure, Google Cloud™, etc.) that provides cloud environment 121

(e.g., public cloud, private cloud, hybrid cloud, etc.). The speed at which data may be accessed is different depending on whether the data is associated with the first performance storage class 123, the second performance storage class 124, or the third performance storage class 125.

Data plane 112 includes one or more cloud servers 113 (e.g., one or more EC2 instances). The one or more cloud servers 113 may be associated with corresponding processors, corresponding memory, and corresponding storage. In some embodiments, data plane 112 includes multiple sets of one or more cloud servers 113. For example, data plane 113 may include a first set of one or more cloud servers 113 that is associated with a first region and a second set of one or more cloud servers 113 that is associated with a second region. The one or more cloud servers 113 include a deduplication table 114 that associates chunk identifiers with data chunks stored in cloud storage 122. In some embodiments, deduplication table 114 associates chunk identifiers with data chunks associated with the first performance storage class 123, but not data chunks associated with the second performance storage class 124 or the third performance storage class 125. This may reduce the overall size of deduplication table 114 maintained by file system manager 115. In some embodiments, deduplication table 114 stores chunk identifiers for a portion of the data chunks that are associated with the first performance storage class 123. For example, the chunk identifiers associated with the most popular data chunks (e.g., data chunks referenced by a threshold number of files or objects) or the most recent data chunks (e.g., data chunks that were stored to cloud storage 122 within a particular period of time) may be included in deduplication table 114.

Data plane 112 includes backup engine 118 that is configured to determine when source system 103 is to perform a backup according to a backup policy. The backup policy may indicate a frequency at which a backup is to be performed (e.g., hourly, daily, weekly, etc.), an amount of change data for which a backup is to be performed (e.g., more than 10 GB of changed data), or in response to a user command. Backup engine 118 may provide to the one or more client-side components 104 a specification of content to be backed up from source system 103 to cloud storage 122. In some embodiments, the specification of content describes a full backup of source system 103. In some embodiments, the specification of content describes an incremental backup of source system 103. In some embodiments, the specification of content describes a full backup of an object included in source system 103 (e.g., virtual machine, container, application). In some embodiments, the specification of content describes an incremental backup of an object included in source system 103. In some embodiments, the specification of content describes a storage tier for one or more objects stored on source system 103. For example, a backup of a file stored on source system 103 may be tiered to the first performance storage class 123, the second performance storage class 124, or the third performance storage class 125.

Data plane 112 includes tiering engine 111. A client-side component may receive from tiering engine 111 a specification of content to be tiered from source system 103 to cloud storage 122. In some embodiments, the specification of content describes a storage tier for one or more objects stored on source system 103. For example, a file stored on source system 103 may be tiered from source system 103 to a first performance storage class 123, a second performance storage class 124, or a third performance storage class 125.

Data plane 112 includes replication engine 131. A client-side component may receive from replication engine 131 a specification of content to be replicated from source system 103 to cloud storage 122. In some embodiments, the specification of content describes a storage tier for one or more objects stored on source system 103. For example, a file stored on source system 103 may be replicated from source system 103 to a first performance storage class 123, a second performance storage class 124, or a third performance storage class 125.

The one or more client-side components 104 are configured to receive the content in a plurality of portions from source system 103. For each received portion of content, a client-side component divides the received portion of content into a plurality of data chunks. In some embodiments, a specification of content to be stored in cloud storage 122 is received from backup engine 118. In some embodiments, a specification of content to be stored in cloud storage 122 is received from source system 103. In some embodiments, the plurality of data chunks may be of variable size. The one or more client-side components 104 may generate corresponding chunk identifiers (e.g., SHA-1 identifier, SHA-2 identifier, SHA-256 identifier, etc.) for each of the plurality of data chunks included in a portion of received content.

A client-side component may identify one or more data chunks of the plurality of data chunks that are to be sent via network connection 120 to cloud storage 122 at least in part by sending to file system manager 115 the corresponding chunk identifiers for each of the plurality of data chunks included in a portion of received content. In response to receiving the corresponding chunk identifiers for each of the plurality of data chunks, file system manager 115 is configured to compare each of the corresponding chunk identifiers to chunk identifiers included in deduplication table 114. The chunk identifiers included in deduplication table 114 indicate at least some of the data chunks that are stored in cloud storage 122.

File system manager 115 is configured to provide the client-side component a data structure that indicates the one or more chunk identifiers of the one or more received chunk identifiers that are not included in deduplication table 114. In some embodiments, the one or more chunk identifiers not included in deduplication table 114 correspond to data chunks that are not stored at cloud storage 122. In some embodiments, the one or more chunk identifiers not included in the deduplication table correspond to one or more data chunks that are stored at cloud storage 122, but the one or more chunk identifiers associated with the one or more data chunks that are stored at cloud storage 122 are not included in deduplication table 114 due to one or more factors, such as whether the data chunk is referenced by a tree data structure that was generated after a particular date, a recency of when the data chunk was last deduplicated, a frequency at which the data chunk is deduplicated, a service level agreement, a storage tier of a data chunk, etc. In response to receiving the data structure, the client-side component is configured to use the data structure to identify the one or more data chunks of the portion of the received content that are to be sent via network connection 120 to be stored at cloud storage 122.

File system manager 115 may also provide an indication of one or more cloud storage element objects of cloud storage 122 to which a client-side component may write the one or more data chunks associated with the one or more chunk identifiers included in the data structure. In some embodiments, the indication includes a size of a batch of data chunks to create. In some embodiments, the indication of the one or more cloud storage element objects includes corresponding cloud storage element object identifiers. In some embodiments, the one or more cloud storage element objects include one or more new cloud storage element objects, one or more existing cloud storage element objects, and/or one or more cloud storage element objects yet to be created. In some embodiments, file system manager 115 periodically (e.g., every hour) provides to the one or more client-side components 104 an indication of a set of one or more cloud storage element objects.

A client-side component may receive an encryption key from encryption key manager 119. Encryption key manager 119 manages encryption keys for a plurality of storage tenants. The received encryption key is particular to the storage tenant. In some embodiments, the encryption key enables read for a cloud storage element object associated with the storage tenant at a credential level or write access for a new cloud storage element object associated with the storage tenant at a credential level. For example, some cloud storage element objects may each have a unique credential. In some embodiments, the encryption key enables read or write access for a cloud storage element object associated with the storage tenant at a prefix level. For example, a prefix may be a partial or full file path in the cloud storage. A prefix may be unique to a storage tenant. Some or all cloud storage element objects of a particular storage tenant may be stored in cloud storage and share a prefix. The encryption key may expire after a particular amount of time. Source system 103 may be hacked and having the encryption key expire after the particular amount of time may prevent a hacker from accessing any of the cloud storage element objects stored at cloud storage 122.

A client-side component may combine a plurality of the identified data chunks into one or more batches. A default size of a cloud storage element object may be specified. In some embodiments the default size of the cloud storage object is 8 MB. In some embodiments, a size of the cloud storage element object is 8 MB. Storing a batch of default size at cloud storage 122 is an efficient use of the cloud storage. In some embodiments, a size of a batch of data chunks is less than the default size of the cloud storage element object, but greater than or equal to a threshold size. This is a sub-optimal configuration of cloud storage 122 due to overhead costs associated with future operations on the cloud storage element objects. In some embodiments, a size of a batch of data chunks is less than the default size of the cloud storage element object and less than the threshold size.

In some embodiments, a default range size of a cloud storage element object is specified (e.g., 4 MB-12 MB). In some embodiments, the size of a batch of data chunks is within the default size range of a cloud storage element object. In some embodiments, the size of a batch of data chunks is not within the default size range of a cloud storage element object.

Prior to writing a batch of data chunks to a cloud storage element object of cloud storage 122, a client-side component may compare a batch size of a batch to a threshold size (e.g., 4 MB). Additional overhead costs may be incurred by storing at cloud storage 122 cloud storage element objects that have a size that is less than the threshold size. Such cloud storage element objects may require additional application programming interface (API) calls to access the cloud storage element objects, which may add to the overall time and resources needed to perform a data management function (e.g., garbage collection, deduplication, replication, backup, etc.).

In the event the batch size of a batch is greater than or equal to the threshold size, the client-side component may encrypt the data chunks included in the batch with the received encryption key and write the encrypted data chunks to one of the cloud storage element objects identified by file system manager 115. In some embodiments, the data chunks are compressed prior to being encrypted. The client-side component may write the encrypted data chunks to a cloud storage element object associated with the first performance storage class 123, the second performance storage class 124, or the third performance storage class 125. The performance storage class to which the client-side component 104 writes the batch of data chunks may depend on a service level agreement associated with a storage tenant. In the event the batch size of the batch is not greater than or equal to the threshold size, the one or more client-side components 104 write one or more data chunks included in the batch to storage 116 of the one or more cloud servers 113. In some embodiments, the cloud storage element object associated with the cloud storage is a new cloud storage element object. In some embodiments, the cloud storage element object associated with the cloud storage is an existing cloud storage element object. In the event the cloud storage element object associated with the cloud storage is an existing cloud storage element object, the file system manager may read the data chunks associated with the existing cloud storage element object, combine the read data chunks with one or more new data chunks to generate a new version of the cloud storage element object, create an index for the new version of the cloud storage element object, and include the index in the new version of the cloud storage element object. In some embodiments, the index includes file offsets associated with the data chunks included in the cloud storage element object. In some embodiments, the index includes a pointer to a group of data chunks that were compressed and included in the cloud storage element object. The index may include an object id and a version number.

In the event the batch size of a batch is not greater than or equal to the threshold size, the client-side component may determine whether a batch period greater than or equal to a batch threshold period has passed. The client-side component may store in-memory the data chunk(s) included in the batch for the batch threshold period (e.g., <1 seconds) to allow additional data chunks to be included in the batch.

In the event the batch period is not greater than or equal to the batch threshold period, the client-side component processes a subsequent portion of the specified content to identify one or more data chunks of the subsequent portion of the specified content that are to be stored in the cloud storage. The one or more data chunks of the subsequent portion are combined with the one or more data chunks of the previous portion to generate a new batch of data chunks. The client-side component determines whether a size of the new batch of data chunks is greater than the threshold size. If it is, then the client-side component determines whether the batch period is greater than or equal to the batch threshold period. If it is not, then the above process repeats until the batch threshold period is greater than or equal to the batch threshold period.

In the event the batch period is greater than or equal to the batch threshold, the client-side component may provide one or more data chunks included in the batch to cloud server 113. In response to receiving the one or more data chunks, file system manager 115 may aggregate the one or more received data chunks with one or more other received data chunks. In some embodiments, the one or more received data chunks and the one or more other received data chunks are received from the same client-side component. In some embodiments, the one or more received data chunks and the one or more other received data chunks are received from a plurality of client-side components. In some embodiments, file system manager 115 determines whether a cumulative size of the aggregated data chunks is greater than the threshold size and less than a maximum size for a cloud storage object. In some embodiments, file system manager 115 determines whether a cumulative size of the aggregated data chunks is within a default size range. In the event the cumulative size of the aggregated data chunks is greater than the threshold size and less than the maximum size for the cloud storage object, or within the default size range, file system manager 115 may batch the aggregated data chunks, encrypt the batched data chunks using an encryption key associated with the storage tenant, and write the batched data chunks to a cloud storage element object associated with cloud storage 122 via connection 130. In some embodiments, connection 130 is an HTTPS connection or other type of connection. In some embodiments, the data chunks are compressed prior to being encrypted. File system manager 115 may write the encrypted data chunks to a cloud storage element object associated with the first performance storage class 123, the second performance storage class 124, or the third performance storage class 125. In the event the cumulative size of the aggregated data chunks is not greater than the threshold size, file system manager 115 may determine if the total time that the one or more received data chunks have been stored in storage 116 is greater than a threshold time. In the event the total time is greater than the threshold time, then file system manager 115 may batch the one or more received data chunks and one or more other received data chunks, if any, encrypt the batched data chunks using an encryption key associated with the storage tenant, and write the batched data chunks to a cloud storage element object associated with cloud storage 122.

In some embodiments, the cloud storage element object associated with the cloud storage is a new cloud storage element object. In some embodiments, the cloud storage element object associated with the cloud storage is a cloud storage element object yet to be created. In some embodiments, the cloud storage element object associated with the cloud storage is an existing cloud storage element object. In the event the cloud storage element object associated with the cloud storage is an existing cloud storage element object, the file system manager may read the data chunks associated with the existing cloud storage element object, combine the read data chunks with one or more new data chunks to generate a new version of the cloud storage element object, create an index for the new version of the cloud storage element object, and include the index in the new version of the cloud storage element object. The index may include an object id and a version number. In the event the total time is not greater than the threshold time, file system manager 115 continues to aggregate a plurality of data chunks.

After the one or more client-side components 104 have written some or all of one or more batches of data chunks to one or more cloud storage element objects of cloud storage 122, the one or more client-side components 104 may be configured to provide file system manager 115 an indication that the one or more cloud storage element objects have been finalized (e.g., the one or more data chunks have been stored at a referenced portion of cloud storage 122). A cloud storage element object may be finalized when cloud storage 122 receives and stores all of the plurality of data chunks associated with the cloud storage element object. In response to receiving the indication, file system manager 115 is configured to generate metadata for the one or more data chunks stored in cloud storage 122 by one of the one or more client-side components 104. The metadata for the one or more data chunks may include a tree data structure that organizes the one or more data chunks. An example of the tree data structure is a snapshot tree, which may be based on a B+ tree structure (or other type of tree structure in other embodiments). An example of a tree data structure is described in U.S. patent application Ser. No. 16/287,214 entitled "Deploying A Cloud Instance Of A User Virtual Machine," filed on Feb. 27, 2019, which is incorporated herein by reference for all purposes.

Figure 2:
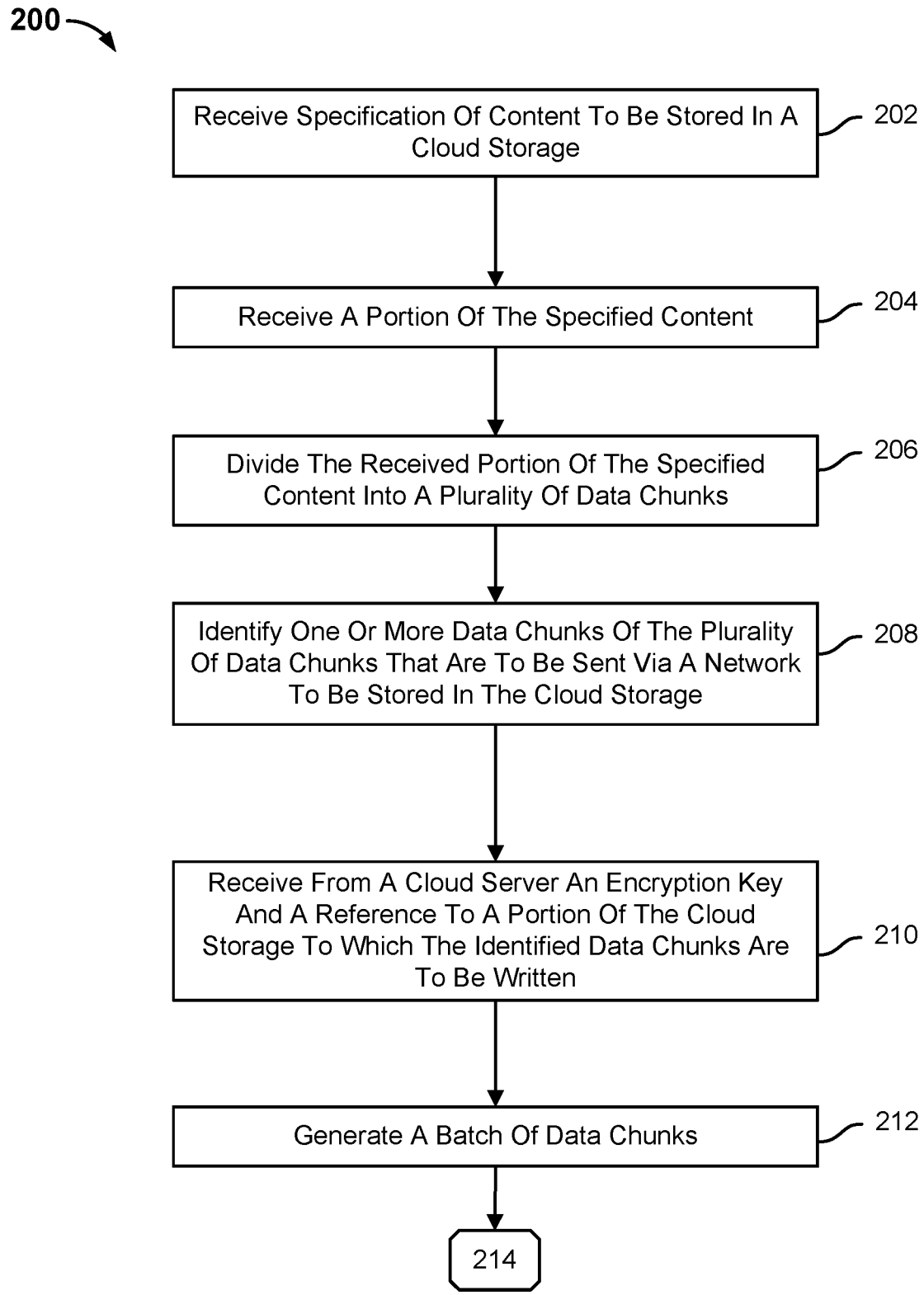
FIG. 2 is a flow diagram illustrating a process for backing up data to a cloud storage in accordance with some embodiments.
Figure 2:
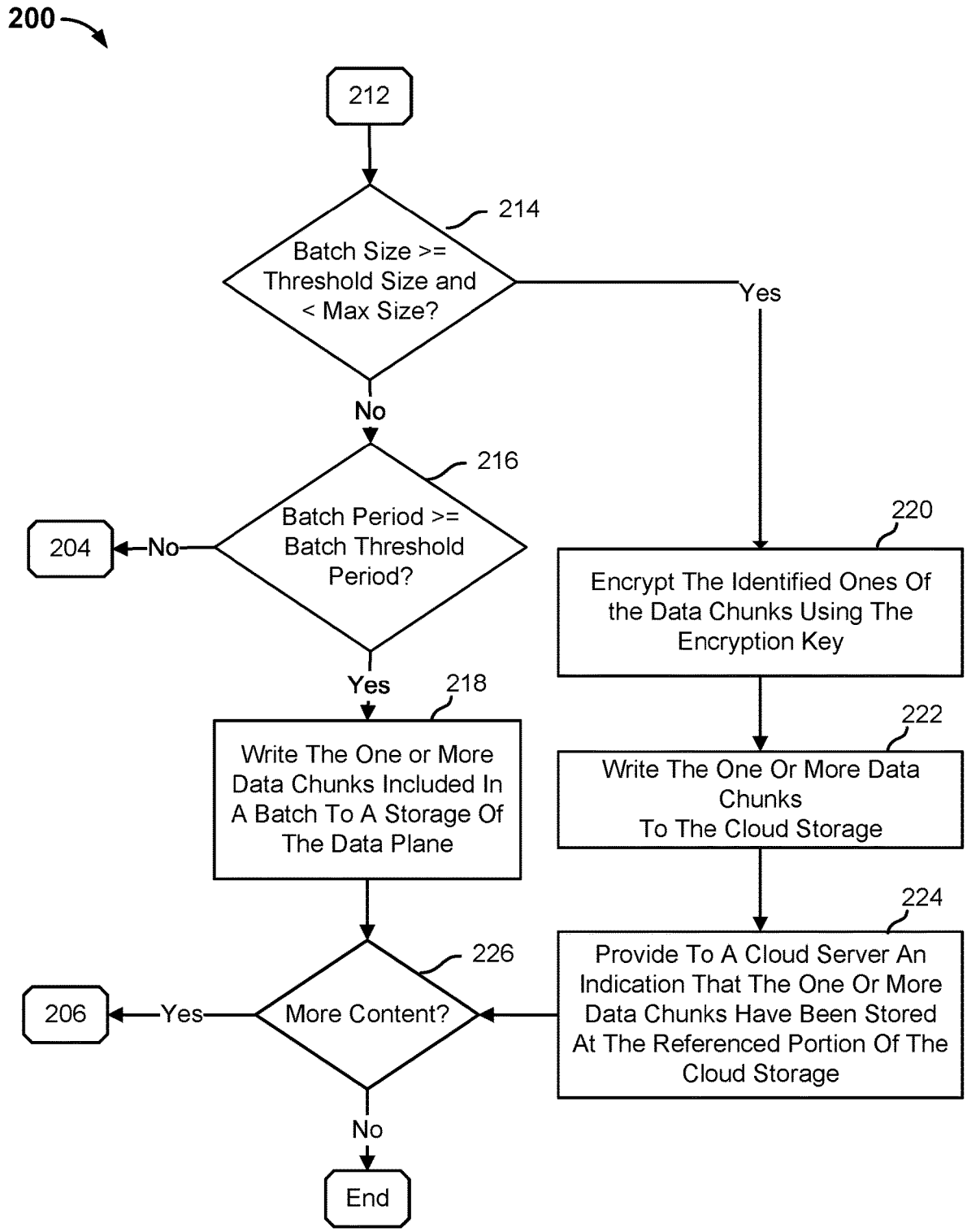

FIG. 2 is a flow diagram illustrating a process for backing up data to a cloud storage in accordance with some embodiments. In the example shown, process 200 may be implemented by a client-side component, such as one of the one or more client-side components 104.

At 202, a specification of content to be stored in a cloud storage is received. The specification may be received from a backup engine. In some embodiments, the backup engine is part of a data plane that is located in a cloud environment provided by a cloud service provider. In some embodiments, the specification is received from a source system.

In some embodiments, the specification of content describes a full backup of a source system. In some embodiments, the specification of content describes an incremental backup of a source system. In some embodiments, the specification of content describes a plurality of backups of a source system. In some embodiments, the specification of content describes a full backup of an object included in the source system (e.g., virtual machine, container, database, application). In some embodiments, the specification of content describes an incremental backup of an object included in a source system. In some embodiments, the specification of content describes a storage tier for one or more objects stored on a source system. For example, a backup of a file stored on a source system may be tiered to the first performance storage class, the second performance storage class, or the third performance storage class.

At 204, a portion of the specified content is received at a client-side component from a source system. For example, 8 MB of a 1 TB backup may be received. Multiple portions of the specified content are received at the client-side component from the source system until a data management operation (e.g., backup, tiering, replication) is completed. The portion of the specified content may include metadata associated with one or more objects stored on the source system (e.g., owner, created, last update, size, permissions, etc.) and/or data content associated with the one or more objects stored on the source system.

At 206, the received portion of the specified content is divided into a plurality of data chunks. In some embodiments, the plurality of data chunks may be of variable size.

At 208, one or more data chunks of the plurality of data chunks to be sent via a network to be stored in the cloud storage are identified. A corresponding chunk identifier is computed for each of the one or more data chunks. Data chunk metadata that includes the one or more corresponding chunk identifiers, corresponding data chunk size, and corresponding object offsets is sent to a file system manager. The data chunk metadata indicates a sequence of data chunks within an object. For example, the data chunk metadata may indicate that a first data chunk having a chunk identifier of C1 is associated with an object offset of 0 MB-1 MB and has a data chunk size of 1 MB, a second data chunk having a chunk identifier of C2 is associated with an object offset of 1 MB-2 MB and has a data chunk of 1 MB, . . . , and an 8th data chunk identifier of C8 is associated with an object offset of 7 MB-8 MB and has a data chunk size of 1 MB. In response to receiving the one or more corresponding chunk identifiers, the file system manager may determine whether any of the one or more corresponding chunk identifiers are included in a deduplication table by comparing each of the corresponding chunk identifiers to chunk identifiers included in a deduplication table. In some embodiments, the one or more chunk identifiers not included in the deduplication table correspond to data chunks that are not stored at a cloud storage. In some embodiments, the one or more chunk identifiers not included in the deduplication table correspond to one or more data chunks that are stored at the cloud storage; however, data chunks which are stored at the cloud storage may not be included in the deduplication table due to one or more factors, such as whether the data chunk is referenced by a tree data structure that was generated after a particular date, a recency of when the data chunk was last deduplicated, a frequency at which the data chunk is deduplicated, a service level agreement, a storage tier of a data chunk, etc. The file system manager may identify which of the one or more corresponding chunk identifiers correspond to data chunks that are not included in the deduplication table stored at the cloud storage and provide to a client-side component a data structure that includes the identified one or more corresponding chunk identifiers.

At 210, an encryption key and a reference to a portion of a cloud storage where one or more data chunks are to be stored are received from a cloud server. The encryption key is particular to a storage tenant. The encryption key may expire after a particular amount of time. In some embodiments, the encryption key enables read access for a cloud storage element object associated with the storage tenant at a credential level or write access for a new cloud storage element object associated with the storage tenant at a credential level. For example, some cloud storage element objects may each have a unique credential. In some embodiments, the encryption key enables read or write access for a cloud storage element object associated with the storage tenant at a prefix level. For example, a prefix may be a partial or full file path in the cloud storage. A prefix may be unique to a storage tenant. Some or all cloud storage element objects of a particular storage tenant may be stored in cloud storage and share a prefix.

The reference to a portion of the cloud storage may identify one or more cloud storage element objects of the cloud storage to which one or more data chunks are to be stored. For example, the reference to the portion of the cloud storage may include corresponding identifiers for a set of one or more cloud storage element objects. In some embodiments, the set of one or more cloud storage element objects include one or more new cloud storage element objects, one or more existing cloud storage element objects, and/or one or more cloud storage element objects yet to be created. In some embodiments, a reference may comprise a cloud storage element object name which is to be used to create a new cloud storage element object. In some embodiments, the reference to one or more cloud storage element objects is periodically received from the data plane. In some embodiments, the one or more cloud storage element objects included in the reference are available to be written for a threshold period of time (e.g., 1 hour).

The one or more identified cloud storage element objects may be stored in a first performance storage class of a cloud storage, a second performance storage class of the cloud storage, or a third performance storage class of the cloud storage.

At 212, a batch of data chunks is generated. The data chunks included in the batch correspond to the one or more data chunks identified by the file system manager of the cloud server.

At 214, it is determined whether a batch size of the generated batch is greater than or equal to a threshold size and less than a maximum size for a cloud storage element object. The size of the generated batch varies based on the number of data chunks included in the received portion of specified content that are already stored in cloud storage.

In the event the generated batch size is greater than or equal to the threshold size (e.g., 4 MB) and less than a maximum size for a cloud storage element object, process 200 proceeds to step 220. In the event the batch size of a batch is not greater than or equal to the threshold size, process 200 proceeds to 216. In the event the generated batch size is greater than or equal to the maximum size for a cloud storage element object, the generated batch is split into two or more batches where each batch is greater than or equal to the threshold size and less than the maximum size for a cloud storage element object. In such a scenario, process 200 proceeds to 220 for each of the batches.

In some embodiments, at 214, it is determined whether the generated batch size is within a default size range for a cloud storage element object (e.g., 4 MB-12 MB). In the event the size of the generated batch is within the default size range, process 200 proceeds to 220. In the event the generated batch size is not within the default size range, process 200 proceeds to 216.

At 216, it is determined whether a batch period is greater than or equal to a batch threshold period. For a generated batch that is less than a threshold size, data chunks included in the generated batch may be stored in memory for a batch threshold period (e.g., <1 second) to allow additional data chunks to be included in the batch. Storing a batch of data chunks that is less than the threshold size in a cloud storage element object at cloud storage may cause the recovery process of an object associated with the cloud storage element object to be slow because additional reads need to be performed when restoring the object associated with the cloud storage element object.

In the event the batch period is greater than or equal to the batch threshold period, process 200 proceeds to 218. In the event the batch period is not greater than or equal to the batch threshold period, process 200 returns to 204 where the client-side component processes a subsequent portion of the specified content to identify one or more data chunks of the subsequent portion of the specified content that are to be stored in the cloud storage. The one or more data chunks of the subsequent portion are combined with the one or more data chunks of the previous portion to generate a new batch of data chunks. The client-side component determines whether a size of the new batch of data chunks is greater than or equal to the threshold size. If it is, then process 200 proceeds to step 220. If it is not, then process 200 proceeds to step 216 and the above process repeats until the batch threshold period is greater than or equal to the batch threshold period.

At 218, the one or more data chunks included in a batch and an index of the one or more data chunks included in the batch are written to a storage of a cloud server included in the data plane. The one or more data chunks may be provided to a cloud server of the data plane via an encrypted channel, such as a gRPC connection. In some embodiments, the one or more data chunks are encrypted.

At 220, the data chunks included in the batch are encrypted using the encryption key received at 210. In some embodiments, the data chunks are compressed prior to being encrypted. At 222, the encrypted data chunks are written to a referenced portion of the cloud storage identified at 210. In some embodiments, a cloud storage element object is generated with the one or more data chunks and written to the cloud storage identified at 210. A cloud storage may be selected among a plurality of different cloud storage destinations associated with different performance storage classes. The selected cloud storage may be based on a service level agreement associated with a storage tenant.

At 224, an indication that the one or more identified data chunks are stored at the referenced portion of the cloud storage is provided to a cloud server. The referenced portion of the cloud storage may include one or more existing cloud storage element objects and/or one or more new cloud storage element objects. A cloud server hosting a file system manager in the data plane, such as cloud server 113, may receive the indication. The indication may include the corresponding chunk identifiers for the one or more data chunks that were sent at step 208 as well as cloud storage locations for the one or more data chunks that were written to cloud storage at step 222. In response to receiving the indication, the file system manager is configured to generate metadata (e.g., tree data structure, chunk metadata data structure, cloud storage element object metadata data structure) that enables the one or more data chunks that were written to cloud storage to be located and provides a view (partial or complete) of the source system at a particular moment in time.

At 226, it is determined whether any additional portions of the specified content have been received at the client-side component. In the event any additional portions of the specified content have been received at the client-side component, process 200 returns to step 206. In the event any additional portions of the specified content have not been received at the client-side component, process 200 ends.

Figure 3:
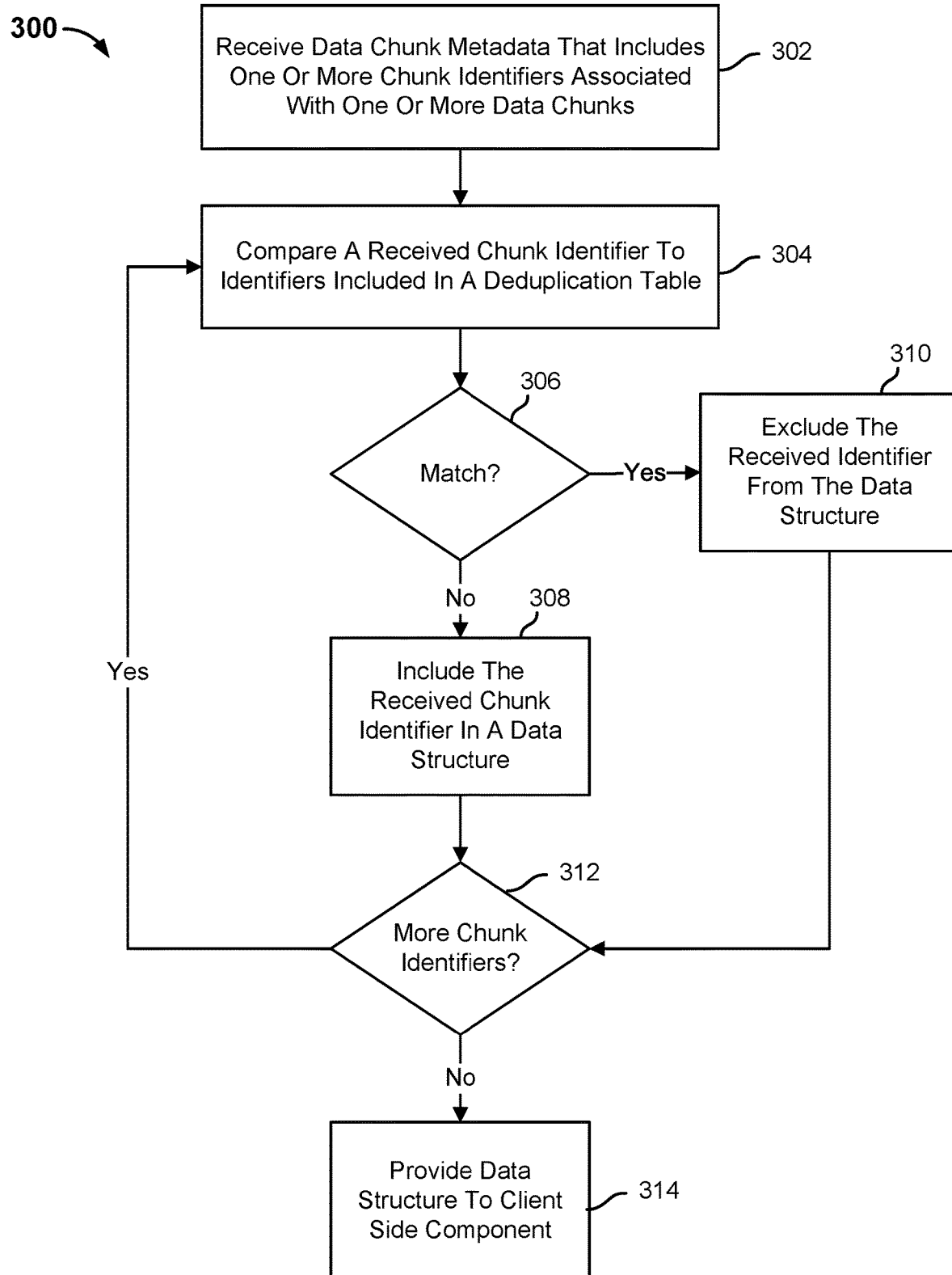
FIG. 3 is a flow diagram illustrating a process for determining which data chunks to back up to a cloud storage in accordance with some embodiments.

FIG. 3 is a flow diagram illustrating a process for determining which data chunks to provide to a cloud storage in accordance with some embodiments. In the example shown, process 300 may be implemented by a file system manager, such as file system manager 115.

At 302, data chunk metadata that includes one or more chunk identifiers associated with one or more data chunks is received. A chunk identifier may be a unique identifier, such as an SHA-1 identifier. The one or more chunk identifiers may be associated with a particular amount of data (e.g., 4 MB of data). The data chunk metadata may include other information, such as data chunk size and object offset for a data chunk. The data chunk metadata indicates a sequence of data chunks within an object.

At 304, a received chunk identifier is compared to identifiers included in a deduplication table. The deduplication table may associate data chunks with their corresponding chunk identifiers. The deduplication table may identify some or all of the data chunks that are stored in a cloud storage. In some embodiments, the one or more chunk identifiers not included in the deduplication table correspond to data chunks that are not stored at a cloud storage. In some embodiments, the one or more chunk identifiers not included in the deduplication table correspond to one or more data chunks that are stored at the cloud storage, but the one or more chunk identifiers associated with the one or more data chunks that are stored at cloud storage are not included in a deduplication table due to one or more factors, such as whether the data chunk is referenced by a tree data structure that was generated after a particular date, a recency of when the data chunk was last deduplicated, a frequency at which the data chunk is deduplicated, a service level agreement, a storage tier of a data chunk, etc.

The cloud storage may be associated with a plurality of performance storage classes. The deduplication table may indicate in which performance storage class of the cloud storage a data chunk is stored. In some embodiments, the deduplication table only identifies the data chunks that are stored in a top performance storage class of the cloud storage. In some embodiments, the deduplication table identifies the data chunks that are stored in the cloud storage based on a service level agreement associated with a storage tenant. For example, the service level agreement associated with a storage tenant may allow the storage tenant to store data chunks in a first performance storage class and a second performance storage class. The deduplication table may identify the data chunks that are stored in the first performance storage class of the cloud storage and the second performance storage class of the cloud storage.

At 306, it is determined whether there is a match between the received chunk identifier and one of the chunk identifiers included in the deduplication table. In the event there is a match between the received chunk identifier and one of the chunk identifiers included in the deduplication table, process 300 proceeds to 310. In the event there is not a match between the received chunk identifier and one of the chunk identifiers included in the deduplication table, process 300 proceeds to 308.

At 308, the received chunk identifier is included in a data structure. In some embodiments, the data structure indicates one or more chunk identifiers associated with one or more data chunks that are not stored at a cloud storage. In some embodiments, the data structure indicates one or more chunk identifiers associated with one or more data chunks that are stored at the cloud storage, but the one or more data chunks that are stored at the cloud storage are excluded from the deduplication table due to one or more factors, such as whether the data chunk is referenced by a tree data structure that was generated after a particular date, a recency of when the data chunk was last deduplicated, a frequency at which the data chunk is deduplicated, a service level agreement, a storage tier of a data chunk, etc.

At 310, the received chunk identifier is excluded from the data structure (e.g., list, table, etc.).

At 312, it is determined whether there are any more chunk identifiers to compare to chunk identifiers included in the deduplication table. In the event there are more chunk identifiers to compare to chunk identifiers included in the deduplication table, process 300 returns to 304. In the event there are no more chunk identifiers to compare to chunk identifiers included in the deduplication table, process 300 proceeds to 314.

At 314, a data structure that includes one or more chunk identifiers is provided to a client-side component. The data structure may be provided to a client-side component at step 208 of process 200.

Figure 4:
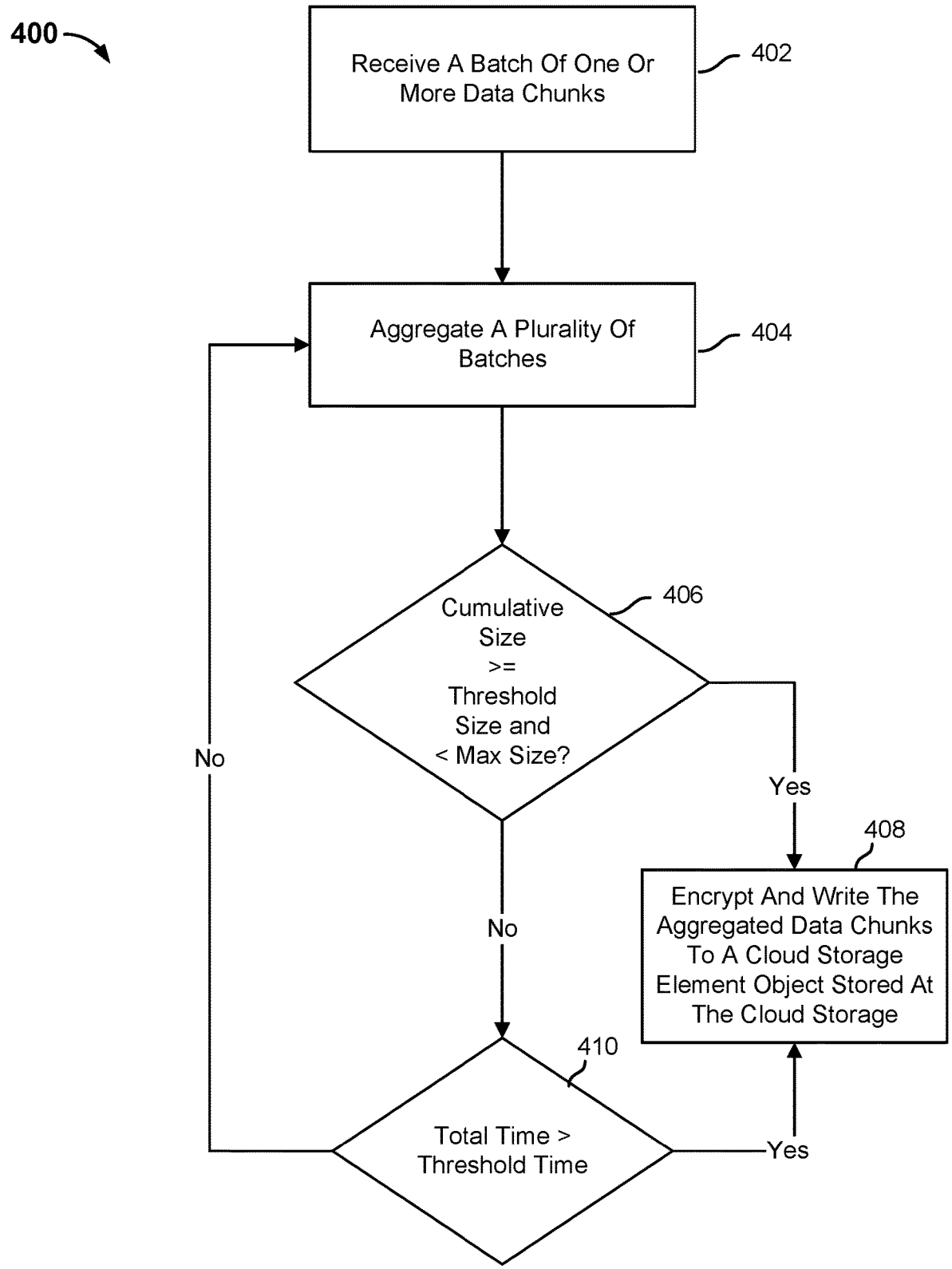
FIG. 4 is a flow diagram illustrating a process for writing data chunks to cloud storage in accordance with some embodiments.

FIG. 4 is a flow diagram illustrating a process for writing data chunks to cloud storage in accordance with some embodiments. In the example shown, process 400 may be performed by one or more cloud servers, such as the one or more cloud servers 113.

At 402, a batch of one or more data chunks is received. A client-side component may have generated a batch of one or more data chunks, but determined that a batch size of the generated batch is less than a threshold size.

At 404, a plurality of data chunks from a plurality of batches are aggregated. The batch of one or more data chunks received at 402 may be aggregated with one or more other batches of data chunks. In some embodiments, the one or more other batches of data chunks are received from the same client-side component that provided the batch of one or more data chunks received at 402. In some embodiments, the one or more other batches of data chunks are received from a different client-side component associated with a tenant. The different client-side component may be located at the same datacenter (e.g., a second client-side component at 104) or located at a different datacenter (e.g., a client-side component located at a datacenter different from datacenter 102).

At 406, it is determined whether the cumulative size of the aggregated data chunks is greater than a threshold size and less than a maximum size for a cloud storage element object. In the event the cumulative size of the aggregated data chunks is greater than or equal to a threshold size and less than the maximum size, process 400 proceeds to 408. In the event the cumulative size of the aggregated data chunks is not greater than or equal to a cloud storage element size threshold, process 400 proceeds to 410.

At 408, the aggregated data chunks are encrypted, the encrypted data chunks are written to a cloud storage element object and stored at the cloud storage. In some embodiments, the data chunks are compressed prior to being encrypted.

At 410, it is determined whether a total time since receiving the batch of one or more data chunks at 402 is greater than a threshold time (e.g., 2 hours). In the event the total time since receiving the one or more data chunks at 402 is greater than the threshold time, process 400 proceeds to 408 where the aggregated data chunks are encrypted and written to a cloud storage element object stored at the cloud storage even though the cumulative size of the aggregated data chunks is less than the threshold size. In some embodiments, the data chunks are compressed prior to being encrypted.

In some embodiments, the cloud storage element object associated with the cloud storage is a new cloud storage element object. In some embodiments, the cloud storage element object associated with the cloud storage is a cloud storage element object yet to be created. In some embodiments, the cloud storage element object associated with the cloud storage is an existing cloud storage element object. In the event the cloud storage element object associated with the cloud storage is an existing cloud storage element object, the file system manager may read the data chunks associated with the existing cloud storage element object, combine the read data chunks with one or more new data chunks to generate a new version of the cloud storage element object, create an index for the new version of the cloud storage element object, and include the index in the new version of the cloud storage element object. The index may include an object id and a version number.

A storage of a cloud server (e.g., EC2 instance) may be less reliable and/or more expensive than a cloud storage (e.g., S3). The one or more data chunks may be written to a cloud storage element object stored at the cloud storage to ensure that the one or more data chunks are not lost in the event the storage of the cloud server fails. In the event the total time since receiving the one or more data chunks at 402 is not greater than the threshold time, process 400 returns to 404.

Figure 5:
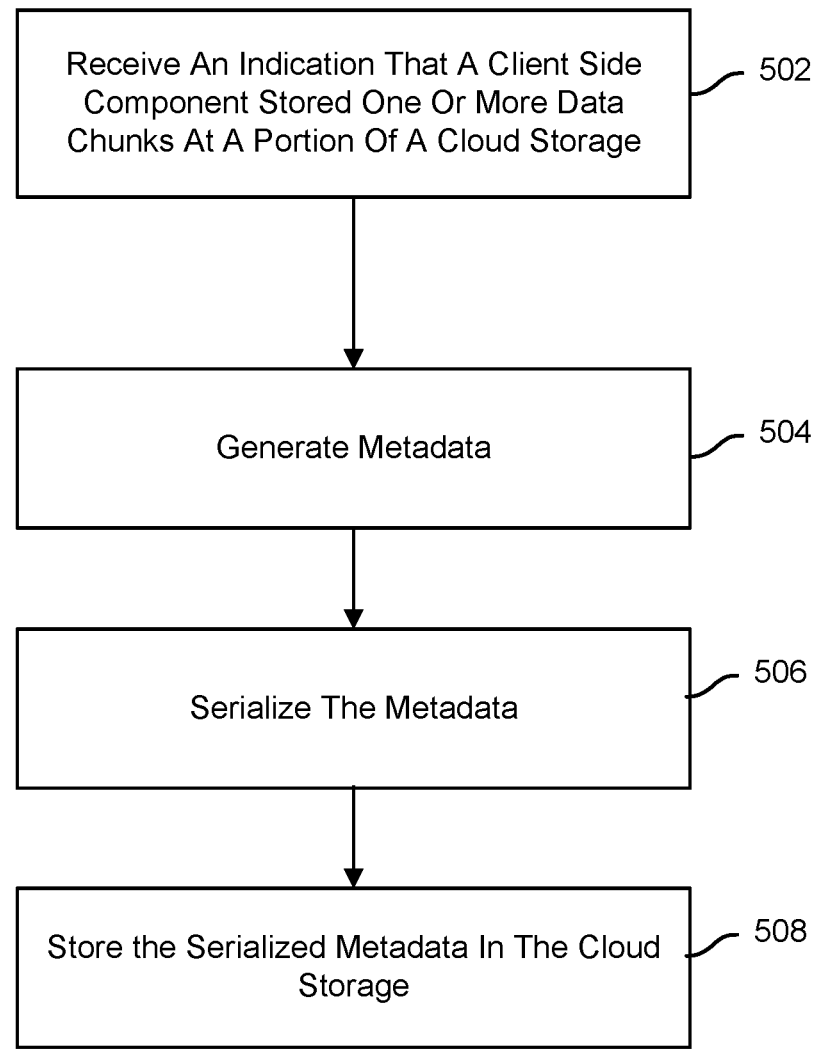
FIG. 5 is a flow diagram illustrating a process for generating metadata in accordance with some embodiments.

FIG. 5 is a flow diagram illustrating a process for generating metadata in accordance with some embodiments. In the example shown, process 500 may be implemented by a cloud server, such as one of the one or more cloud servers 113.

At 502, an indication that a client-side component stored one or more data chunks at a portion of a cloud storage is received from a client-side component. The received indication may indicate the client-side component has finalized sending the one or more data chunks. The received indication may be the indication provided at step 224 of process 200 by a client-side component. The indication may include the corresponding chunk identifiers for the one or more data chunks that were sent from the client-side component at step 208 as well as cloud storage locations for the one or more data chunks that were written to cloud storage at step 222.

At 504, metadata is generated for the one or more data chunks stored in the cloud storage by the client-side component. The one or more data chunks stored in the cloud storage correspond to the content of a source system at a particular moment in time. The one or more data chunks may be stored in one or more cloud storage element objects of the cloud storage. In response to receiving the indication, the file system manager of the cloud server is configured to generate metadata (e.g., tree data structure, chunk metadata data structure, cloud storage element object data structure) that enables the one or more data chunks that were written to cloud storage to be located and provides a view (partial or complete) of the source system at a particular moment in time.

Metadata may be generated that enables the data chunks that correspond to the content of the source system at the particular moment in time to be located. The metadata may include one or more tree data structures that organize the data chunks stored in the one or more cloud storage element objects. An example of the tree data structure is a snapshot tree, which may be based on a B+ tree structure (or other type of tree structure in other embodiments). An example of a tree data structure is described in U.S. patent application Ser. No. 16/287,214 entitled "Deploying A Cloud Instance Of A User Virtual Machine," filed on Feb. 27, 2019.

A snapshot tree includes a root node, one or more levels of one or more intermediate nodes associated with the root node, and one or more leaf nodes associated with an intermediate node of the lowest intermediate level. The root node of a snapshot tree includes one or more pointers to one or more intermediate nodes. Each intermediate node includes one or more pointers to other nodes (e.g., a lower intermediate node or a leaf node). A leaf node may store file system metadata (e.g., owner, created, last update, size, permissions, etc.), data associated with a content file that is less than or equal to a limit size (e.g., 256 kB), an identifier of a data brick, one or more pointers to one or more metadata structures (e.g., Blob structure), etc. A leaf node of the snapshot tree may correspond to an inode.

A metadata structure may be generated for an object (e.g., a content file, a virtual machine, a container, an application, a database, etc.) that is greater than the limit size (e.g., 256 kB) and was included in the source system content that was backed up to the cloud storage. The metadata structure is configured to store the metadata associated with an object that enables the data chunks associated with the object to be located. The metadata structure includes a root node, one or more levels of one or more intermediate nodes associated with the root node, and one or more leaf nodes associated with an intermediate node of the lowest intermediate level. A metadata structure is similar to a snapshot tree, but a leaf node of a metadata structure includes an identifier of a data brick associated with one or more data chunks of the content file and metadata associated with the one or more data chunks (e.g., chunk identifier, cloud storage element object identifier, etc.). A leaf node of the snapshot tree may include a pointer to a root node of the metadata structure corresponding to an object.

The location of the one or more data chunks associated with a data brick may be identified using one or more data structures (e.g., list, table, etc.). A first data structure (e.g., chunk metadata data structure) may store information that associates a plurality of chunk identifiers with their corresponding cloud storage element object identifiers. This indicates that a data chunk having a particular chunk identifier is stored in a cloud storage element object having a particular cloud storage element object identifier. In some embodiments, the chunk metadata data structure is deduplication table 114. A second data structure (e.g., cloud storage element object metadata data structure) may associate a cloud storage element object identifier associated with a cloud storage element object with one or more data chunks stored in the cloud storage element object. The second data structure may also indicate a corresponding cloud storage element object offset for each of the one or more data chunks stored in the cloud storage element object. In some embodiments, the first data structure and the second data structure are combined as a single data structure. The one or more tree data structures, the first data structure, and the second data structure may be stored in metadata store 117, which may be stored in a memory of cloud server 113.

The one or more data chunks associated with a data brick may be located based on the chunk metadata data structure (e.g., a table) and the chunk storage element object metadata data structure. For example, a first data brick having a first brick identifier may be associated with a first chunk identifier (e.g., SHA-1 hash value). The first chunk identifier may be used in conjunction with the chunk metadata data structure to identify a cloud storage element object identifier. A cloud storage element object having the identified cloud storage element object identifier is comprised of a plurality of data chunks. The cloud storage element object metadata data structure may be used to identify a corresponding location of the plurality of data chunks. The cloud storage element object metadata data structure may include corresponding offset information of the plurality of data chunks within a cloud storage element object.

At 506, the metadata for the one or more data chunks is serialized into a data file comprising a flat set of data. The flat set of data includes a plurality of data blocks where each data block of the flat set of data corresponds to a node of the tree data structure. A block that corresponds to a root node or intermediate node of the tree data structure includes a file offset to another data block of a flat set of data. A data block that corresponds to a leaf node includes a reference to a storage location for one or more data chunks with which the leaf node is associated. An example of a serialized data file is described in U.S. patent application Ser. No. 15/689,704 entitled "Snapshot Archive Management," filed on Aug. 29, 2017, which is incorporated herein by reference for all purposes. The metadata may be stored in a metadata store, such as metadata store 117.

At 508, the serialized metadata is stored in the cloud storage. A storage of a cloud server (e.g., EC2 instance) that stores the metadata may be less reliable and/or more expensive than the cloud storage (e.g., S3). The metadata for the one or more data chunks may be serialized and stored at the cloud storage to ensure that the metadata for the one or more data chunks is not lost in the event the storage of the cloud server fails.

Steps 506 and 508 may be periodically (e.g., daily, weekly, bi-monthly, monthly, etc.) performed by a cloud server. In some embodiments, steps 506 and 508 are performed after a particular amount of time has passed after a backup has completed.

Figure 6:
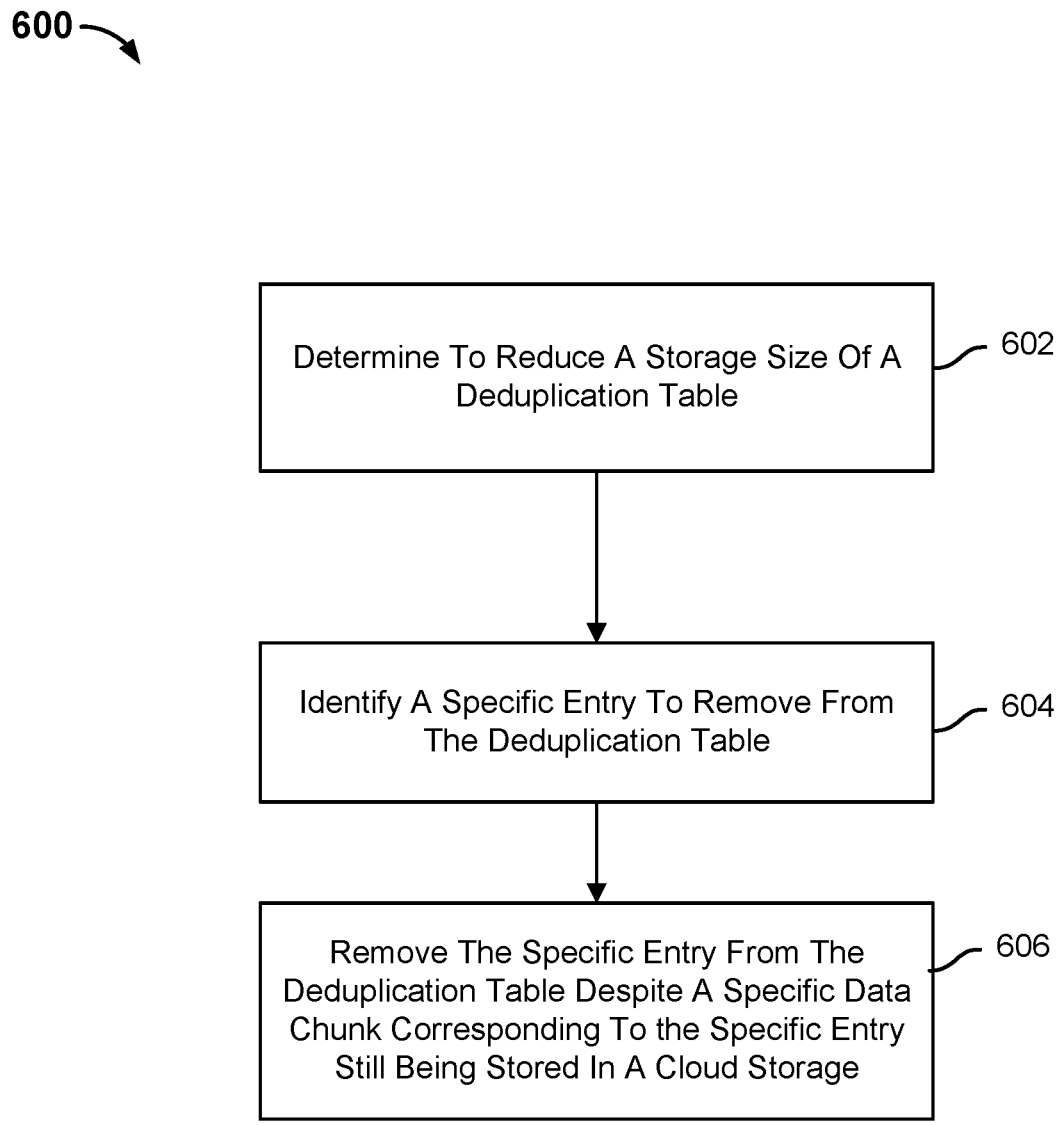
FIG. 6 is a flow diagram illustrating a process for managing a deduplication table in accordance with some embodiments.

FIG. 6 is a flow diagram illustrating a process for managing a deduplication table in accordance with some embodiments. In the example shown, process 600 may be implemented by a file system manager, such as file system manager 115. The deduplication table may be stored in a solid-state drive (SSD) of a cloud server. The amount of storage space in the SSD is finite. A size of the deduplication table may grow as an amount of data stored by a storage tenant at a cloud storage increases. The deduplication table may be managed in a manner described by process 600 to prevent the deduplication table from using an unnecessary amount of the SSD storage because the deduplication table includes references to data chunks that do not need to be deduplicated for one or more different reasons. Process 600 may be performed for each of the chunk identifiers included in a deduplication table. In some embodiments, process 600 is performed as a background process.

At 602, it is determined to reduce a storage size of a deduplication table. In some embodiments, the storage size of a deduplication table has exceeded a threshold max size. In some embodiments, a storage size of the deduplication table is periodically scanned (e.g., daily, weekly, monthly, etc.) to reduce the storage size of the deduplication table. A deduplication table includes a plurality of entries. Each of the entries associates a corresponding chunk identifier to a specific data chunk stored at a cloud storage.

At 604, a specific entry is identified to be removed from the deduplication table. The specific entry may be identified based on one or more properties of the specific entry or a specific data chunk corresponding to the specific entry. For example, a specific entry may not have been accessed within a threshold period of time. The specific data chunk corresponding to the specific entry may be identified based on whether the data chunk is referenced by a tree data structure that was generated after a particular date, a recency of when the data chunk was last deduplicated, a frequency at which the data chunk is deduplicated, etc.

In some embodiments, for the specific entry to be removed from the deduplication table, it is determined whether the data chunk corresponding to the specific entry should be demoted to a lower performance storage class. A cloud storage may include a plurality of performance storage classes. The speed at which data may be accessed at the cloud storage may depend on the performance storage class with which the data chunk is associated. In some embodiments, data chunks that are associated with a top performance storage class are to be deduplicated and include corresponding entries in the deduplication table. In some embodiments, data chunks that are not associated with the top performance storage class are not to be deduplicated and do not include corresponding entries in the deduplication table.

A deduplicated data chunk may be determined to be demoted from the top performance storage class to a lower performance storage class based on one or more factors. For example, the one or more factors may include based on whether the data chunk is referenced by a tree data structure that was generated after a particular date, a recency of when the data chunk was last deduplicated, a frequency at which the data chunk is deduplicated, a service level agreement, a storage tier of a data chunk, etc.

In some embodiments, the one or more factors indicate that the data chunk should remain in its current performance storage class. In some embodiments, the one or more factors indicate that the data chunk should be demoted to a lower performance storage class. In some embodiments, the one or more factors indicate that the data chunk should be upgraded to a higher performance storage class.

In the event it is determined that the data chunk should be demoted to a lower performance storage class, the file system manager determines whether one or more objects that reference the specific data chunk are associated with a performance storage class that is lower than a current performance storage class associated with the specific data chunk. For example, the current performance storage class associated with the specific data chunk may be performance storage class 123 and the performance storage class associated with the one or more objects that reference the specific data chunk may be performance storage class 124 or performance storage class 125. In the event it is determined that the deduplicated data chunk should not be demoted to a lower performance storage class, the deduplication table is maintained in its current state. In the event it is determined that the deduplicated data chunk should be demoted to a lower performance storage class, the performance storage class for the data chunk is modified to the lower performance storage class and the entry corresponding to the data chunk is removed from the deduplication table.

At 606, the specific entry is removed from the deduplication table despite the specific data chunk corresponding to the specific entry still being stored in the cloud storage. This may reduce the amount of storage used by the deduplication table in an SSD of a cloud server.

Figure 7:
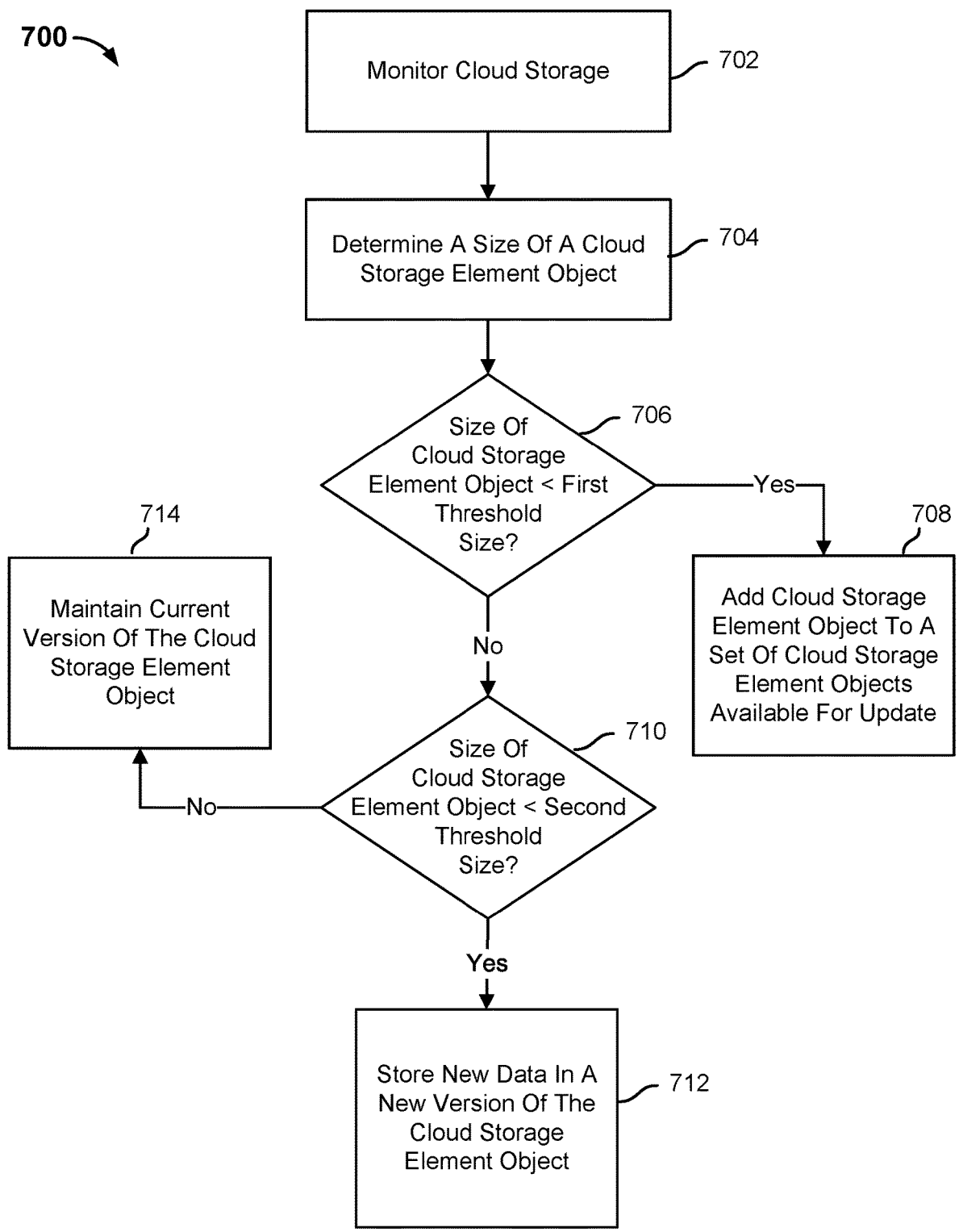
FIG. 7 is a flow diagram illustrating a process for updating a cloud storage element object in accordance with some embodiments.

FIG. 7 is a flow diagram illustrating a process for updating a cloud storage element object in accordance with some embodiments. In the example shown, process 700 may be implemented by a cloud server, such as one of the one or more cloud servers 113.

At 702, a cloud storage is monitored. The cloud storage is configured to store a plurality of cloud storage object elements element objects.

At 704, a size of a cloud storage element object is determined. For example, the size of a cloud storage element object may be 0.5 MB when the default size of the cloud storage element object is 8 MB. In some embodiments, the cloud storage element object has an initial and current size that is less than the default size of a cloud storage element object or smaller than the default size range of a cloud storage element object. In some embodiments, the cloud storage element object has an initial size that is the default size of a cloud storage element object or within the default size range of a cloud storage element object and a current size of the cloud storage element object is less than the default size of a cloud storage element object or smaller than the default size range of a cloud storage element object.

At 706, it is determined whether the size of the cloud storage element object is less than a first threshold size. For example, the first threshold size may be 1 MB. In the event it is determined that the size of the cloud storage element object is less than the first threshold size, process 700 proceeds to 708. In the event it is determined that the size of the cloud storage element object is not less than the first threshold size, process 700 proceeds to 710.

At 708, the cloud storage element object is added to a set of one or more cloud storage element objects available for update. An identifier of the cloud storage element object may be included in a set of one or more cloud storage element object identifiers received by a client-side component at 210.

A client-side component may select the added cloud storage element object from the set of one or more cloud storage element objects and update the selected cloud storage element object with an updated version. The updated version may include previously existing data of the cloud storage element object and additional data. The previously existing data and the additional data may be encrypted using an encryption key associated with a storage tenant.

In some embodiments, the updated version of the cloud storage element object associated with the cloud storage is a new cloud storage element object. For example, the cloud storage element object may be created by the client-side component. In some embodiments, the updated version of the cloud storage element object associated with the cloud storage is an existing cloud storage element object. In the event the updated version of the cloud storage element object associated with the cloud storage is an existing cloud storage element object, the file system manager may read the data chunks associated with the existing cloud storage element object, combine the read data chunks with one or more new data chunks to generate a new version of the cloud storage element object, create an index for the new version of the cloud storage element object, and include the index in the new version of the cloud storage element object. The index may include an object id and a version number.

At 710, it is determined whether the size of the cloud storage element object is less than a second threshold size. For example, the second threshold size may be 4 MB. In the event the size of the cloud storage element object is less than a second threshold size, process 700 proceeds to 712. In the event the size of the cloud storage element object is not less than the second threshold size, process 700 proceeds to 714.

At 712, new data chunks are stored in a new version of the cloud storage element object. In some embodiments, the new data chunks are received from a client-side component. The cloud storage element object is updated to an updated version that includes previously existing data of the cloud storage element object and the new data received from the client-side component. The previously existing data and the new data received from the client-side component may be encrypted using an encryption key associated with a storage tenant and written to a new version of the cloud storage element object.

In some embodiments, the new data chunks are received from a cloud server. The cloud storage element object is updated to an updated version that includes previously existing data of the cloud storage element object and the new data chunks received from the cloud server. The previously existing data and the new data chunks received from the cloud server may be encrypted using an encryption key associated with a storage tenant and written to a new version of the cloud storage element object.

In some embodiments, the previous version of the cloud storage element object is deleted.

At 714, a current version of the cloud storage element object is maintained.

Figure 8:
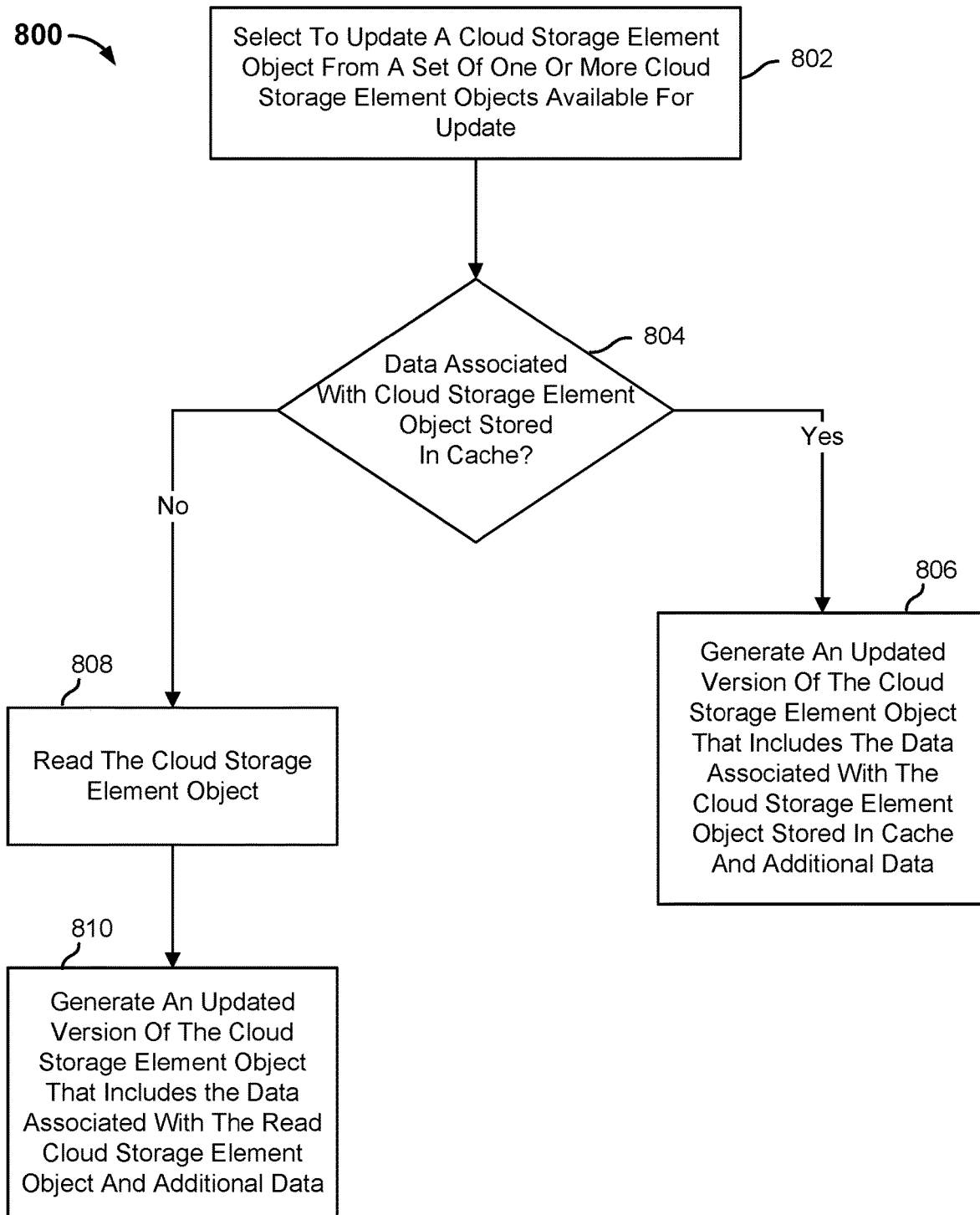
FIG. 8 is a flow diagram illustrating a process for updating a cloud storage element object in accordance with some embodiments.

FIG. 8 is a flow diagram illustrating a process for updating a cloud storage element object in accordance with some embodiments. In the example shown, process 800 may be implemented by a client-side component, such as one of the one or more client-side components 104. In some embodiments, process 800 is implemented to perform some of step 222 of process 200.

At 802, a cloud storage element is selected for update from a set of one or more cloud storage element objects available for update. The set of one or more cloud storage element objects available for update may be received from a file system manager of a cloud server.

At 804, it is determined whether data associated with the cloud storage element object is stored in a cache of the client-side component. In the event data associated with the cloud storage element object is stored in a cache of the client-side component, process 800 proceeds to 806. In the event data associated with the cloud storage element object is not stored in the cache of the client-side component, process 800 proceeds to 808.

At 806, an updated version of the cloud storage element object that includes the data associated with the cloud storage element object stored in the cache and additional data is generated. The data associated with the cloud storage element object and the additional data may be encrypted using the encryption key provided at 210. An index for the new version of the cloud storage element object may be generated and included in the new version of the cloud storage element object. The index may include an object id and a version number.

At 808, the cloud storage element object is read from the cloud storage. The client-side component may temporarily store the read data in a cache of the client-side component.

At 810, an updated version of the cloud storage element object that includes the data associated with the read cloud storage element object and additional data is generated. The data associated with the cloud storage element object and the additional data may be encrypted using the encryption key provided at 210. An index for the new version of the cloud storage element object may be generated and included in the new version of the cloud storage element object. The index may include an object id and a version number.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining at a cloud server that a first size of a first cloud storage element object is at least below a first threshold;
   in response to a first determination, requesting a client-side component to store additional data in the first cloud storage element object including by having the client-side component update the first cloud storage element object with an updated version that includes previously existing data of the first cloud storage element object and the additional data; and
   adding the first cloud storage element object to a set of one or more cloud storage element objects available for update, wherein the client-side component selects the first cloud storage element object from the set of one or more cloud storage element objects available for update, wherein the client-side component generates the updated version of the first cloud storage element object that has a second size that is greater than or equal to the first threshold, wherein to generate the updated version of the first cloud storage element object, the client-side component determines whether the previously existing data of the first cloud storage element object is stored in a cache storage of the client-side component and in response to determining that the previously existing data of the first cloud storage element object is stored in the cache storage of the client-side component, the client-side component uses the previously existing data of the first cloud storage element object stored in the cache storage of the client-side component and additional data to generate the updated version of the first cloud storage element object.

2. The method of claim 1, further comprising monitoring a cloud storage storing the first cloud storage element object.

3. The method of claim 1, wherein an initial size of the first cloud storage element object was above the first threshold and a current size of the first cloud storage element object is below the first threshold.

4. The method of claim 1, wherein an initial size and a current size of the first cloud storage element object are below the first threshold.

5. The method of claim 1, wherein an identifier associated with the first cloud storage element object is included in the set of one or more cloud storage element objects available for update.

6. The method of claim 1, wherein the previously existing data of the first cloud storage element object and the additional data are encrypted using an encryption key received from the cloud server.

7. The method of claim 1, wherein the updated version of the first cloud storage element object is associated with a corresponding identifier and corresponding version number.

8. The method of claim 1, further comprising:
   determining that a third size of a second cloud storage element object is above the first threshold but below a second threshold; and
   in response to a second determination, storing new data chunks in the second cloud storage element object including by updating the second cloud storage element object to be an updated version of the second cloud storage element object that includes previously existing data of the second cloud storage element object and the new data chunks.

9. The method of claim 8, wherein the client-side component encrypts the previously existing data of the second cloud storage element object and the new data chunks using an encryption key associated with a storage tenant.

10. A computer program product embodied in a non-transitory computer readable medium and comprising computer instructions for:
   determining at a cloud server that a size of a first cloud storage element object is at least below a first threshold;
   in response to a first determination, requesting a client-side component to store additional data in the first cloud storage element object including by having the client-side component update the first cloud storage element object with an updated version that includes previously existing data of the first cloud storage element object and the additional data; and
   adding the first cloud storage element object to a set of one or more cloud storage element objects available for update, wherein the client-side component selects the first cloud storage element object from the set of one or more cloud storage element objects available for update, wherein the client-side component generates the updated version of the first cloud storage element object that has a second size that is greater than or equal to the first threshold, wherein to generate the updated version of the first cloud storage element object, the client-side component determines whether the previously existing data of the first cloud storage element object is stored in a cache storage of the client-side component and in response to determining that the previously existing data of the first cloud storage element object is stored in the cache storage of the client-side component, the client-side component uses the previously existing data of the first cloud storage element object stored in the cache storage of the client-side component and additional data to generate the updated version of the first cloud storage element object.

11. The computer program product of claim 10, further comprising computer instructions for monitoring a cloud storage storing the first cloud storage element object.

12. The computer program product of claim 10, wherein an initial size of the first cloud storage element object was above the first threshold and a current size of the first cloud storage element object is below the first threshold.

13. The computer program product of claim 10, wherein an initial size and a current size of the first cloud storage element object are below the first threshold.

14. The computer program product of claim 10, wherein an identifier associated with the first cloud storage element object is included in the set of one or more cloud storage element objects available for update.

15. The computer program product of claim 10, wherein the previously existing data of the first cloud storage element object and the additional data are encrypted using an encryption key received from the cloud server.

16. The computer program product of claim 10, wherein the updated version of the first cloud storage element object is associated with a corresponding identifier and corresponding version number.

17. A system, comprising:
   one or more processors configured to:
      determine at a cloud server that a first size of a first cloud storage element object is at least below a first threshold;
      in response to a first determination, request a client-side component to store additional data in the first cloud storage element object including by having the client-side component update the first cloud storage element object with an updated version that includes previously existing data of the first cloud storage element object and the additional data; and
      add the first cloud storage element object to a set of one or more cloud storage element objects available for update, wherein the client-side component selects the first cloud storage element object from the set of one or more cloud storage element objects available for update, wherein the client-side component is configured to generate the updated version of the first cloud storage element object that has a second size that is greater than or equal to the first threshold, wherein to generate the updated version of the first cloud storage element object, the client-side component determines whether the previously existing data of the first cloud storage element object is stored in a cache storage of the client-side component and in response to determining that the previously existing data of the first cloud storage element object is stored in the cache storage of the client-side component, the client-side component uses the previously existing data of the first cloud storage element object stored in the cache storage of the client-side component and additional data to generate the updated version of the first cloud storage element object; and
   a memory coupled to the one or more processors and configured to provide the one or more processors with instructions.

18. The system of claim 17, wherein the one or more processors are configured to monitor a cloud storage storing the first cloud storage element object.

19. The system of claim 17, wherein an initial size of the first cloud storage element object was above the first threshold and a current size of the first cloud storage element object is below the first threshold.

20. The system of claim 17, wherein an initial size and a current size of the first cloud storage element object are below the first threshold.

* * * * *